INVENTORS.
ALBERT E. BEAUMONT
ARTHUR BRAND III
ALFRED J. WYSOCZANSKI

Feb. 4, 1958 A. E. BEAUMONT ET AL 2,822,088
ELECTRONIC BELT LINK HARDNESS INSPECTION MACHINE
Filed Jan. 27, 1955 3 Sheets-Sheet 2

INVENTORS.
ALBERT E. BEAUMONT
ARTHUR BRAND III
ALFRED J. WYSOCZANSKI
BY
*W. E. Thibodeau, A. W. Dew
and A. E. Arnold, Jr.* ATTORNEYS.

Feb. 4, 1958 A. E. BEAUMONT ET AL 2,822,088
ELECTRONIC BELT LINK HARDNESS INSPECTION MACHINE
Filed Jan. 27, 1955 3 Sheets-Sheet 3

*INVENTORS*
ALBERT E. BEAUMONT
ARTHUR BRAND III
ALFRED J. WYSOCZANSKI
BY
ATTORNEYS:

United States Patent Office 2,822,088
Patented Feb. 4, 1958

2,822,088
ELECTRONIC BELT LINK HARDNESS INSPECTION MACHINE

Albert E. Beaumont, Arthur Brand III, and Alfred J. Wysoczanski, Philadelphia, Pa., assignors to the United States of America as represented by the Secretary of the Army Application January 27, 1955, Serial No. 484,598

15 Claims. (Cl. 209—81)

(Granted under Title 35, U. S. Code (1952), sec. 266)

The invention described herein may be manufactured and used by or for the Government for governmental purposes without payment of any royalty thereon.

Broadly stated, our invention relates to a method of and apparatus for the non-destructive type of testing (i. e., that type of testing wherein the objects are not defaced, distorted, or otherwise rendered unfit for further use) of objects made of magnetic material and subsequent sorting the objects as acceptable or as unacceptable according to the result of the test made. In particular, although not limited solely thereto, our invention relates to a method of and apparatus for non-destructively testing the hardness of objects made of magnetic material, then later separating the objects of acceptable hardness from those of unacceptable hardness. As the description of our invention proceeds, it will be apparent that the principles of our invention may be employed in non-destructively testing characteristics other than hardness (e. g., whether or not the objects are cracked or contain flaws, and whether or not the material, of which the objects are made, is chemically uniform).

One object of our invention is to provide an improved method of non-destructively testing objects made of magnetic materials, then later separating the objects as acceptable or as unacceptable according to the test performed.

Another object is to increase the accuracy and sensitivity of non-destructive type testing procedures.

A further object is to provide apparatus for accomplishing our method.

The foregoing and other objects and advantages of our invention will become apparent from the following description and the accompanying drawings which disclose principles of the invention in a preferred embodiment adapted for testing the hardness of belt links, used in ammunition cartridges, and for sorting those links according to whether the hardness is acceptable or unacceptable. It is to be understood, of course, that the embodiment selected has been chosen arbitrarily and for illustrative purposes only.

Our method, in essence, consists in subjecting the objects to be tested to a magnetizing force; then subjecting the individual objects to a demagnetizing force, which is wholly or partially effective in demagnetizing the object, depending upon the condition of the material of which the object is made; then causing each of the objects to act upon a means, responsive to the amount of magnetism retained, for differentiating between acceptable and unacceptable objects; then sorting the objects as acceptable or as unacceptable according to the operation of the differentiating means.

We have discovered that our method improves the accuracy and the sensitivity of non-destructive type testing procedures, and, consequently, increases the utility thereof so that such procedures can now be used in testing objects which could not be tested thereby heretofore.

Our apparatus, in essence, consists of means for feeding the objects to be tested onto a conveyor which carries the objects past means for subjecting the objects to separate magnetic fields of opposite polarity, and then past means for differentiating between acceptable and unacceptable objects. Acceptable objects remain on the conveyor until they fall therefrom into a guide which directs them away from the apparatus; but unacceptable objects are ejected from the conveyor and are directed, in another path, away from the apparatus. Our apparatus also includes means for synchronizing movement of the conveyor with operation of the magnetizing, the demagnetizing, and the differentiating means.

Base plate, vertical plate, and pedestal

Figure 1:
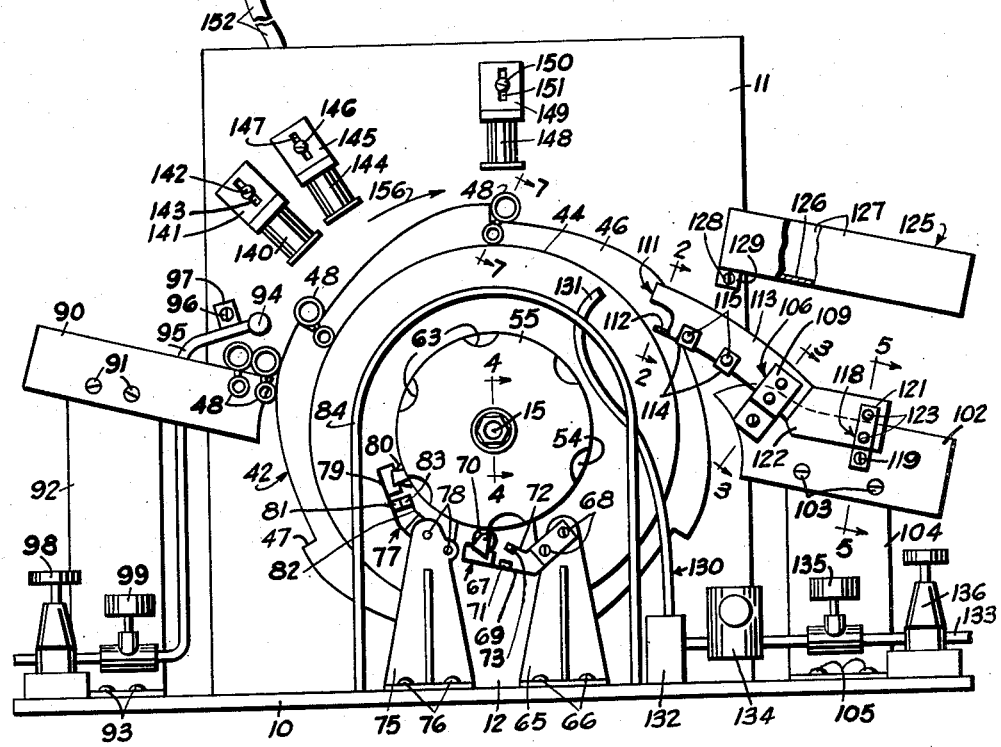
Fig. 1 is a comprehensive side view of a preferred embodiment of our apparatus.
Figure 4:
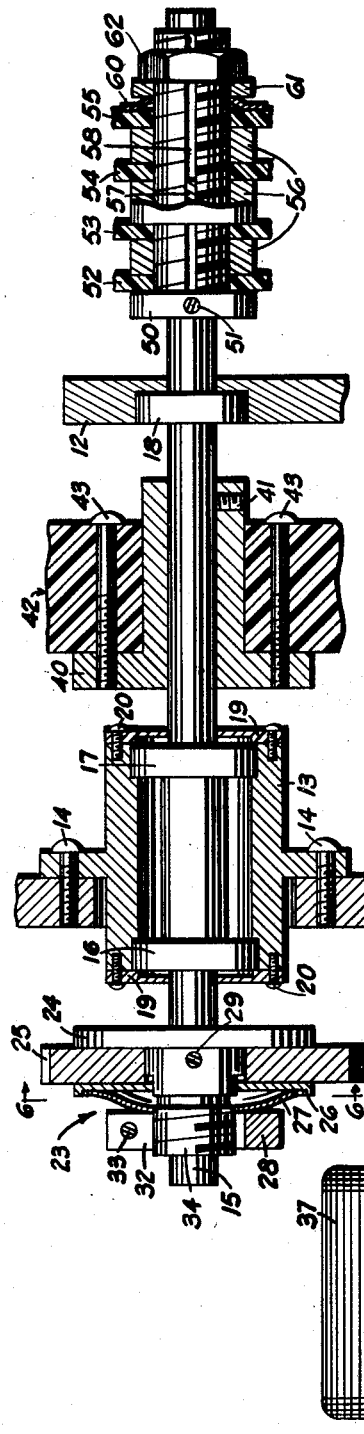
Fig. 4 is a cross section taken along the line 4—4 of Fig. 1 and showing other details relating to the apparatus' main shaft and to other parts associated therewith.
Figure 6:
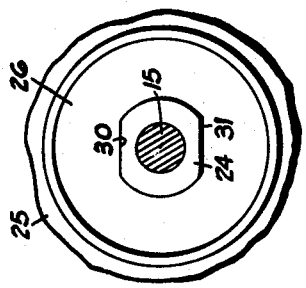
Fig. 6 is a cross section taken along line 6—6 of Fig. 4 and showing additional details relating to a clutch provided on the main shaft. For convenience of drawing and understanding, the right half of Fig. 6 has been included.

As shown in Fig. 1, the apparatus is constructed upon a base plate 10. Secured to this base plate, in any convenient manner (not shown), and extending upwardly therefrom (i. e., toward the top of the drawing sheet in Fig. 1) are a vertical plate 11 and a pedestal 12 (Figs. 1 and 4). As shown in the latter figure, these members are disposed in spaced, parallel relationship to each other. As also shown in Fig. 4, vertical plate 11 is provided with a bearing block 13 which is secured in place thereon in any convenient manner, as by headed screws 14 used in conventional manner.

Main shaft, motor, and clutch

Extending through bearing block 13 and pedestal 12 is a main shaft 15 (Figs. 1 and 4) which is supported for rotation by those members. To facilitate this rotation, shaft 15 is provided with anti-friction bearings 16, 17 and 18 (Fig. 4) which are secured in place, as by press fitting, or other convenient manner. Bearings 16 and 17 are each accommodated in an appropriate recess in bearing block 13, and each is held in place by a retaining ring 19 (Fig. 4); each retaining ring being secured to the bearing block by headed screws 20 which pass through the ring and thread into the bearing block in usual manner. As also shown in Fig. 4, bearing 18 is accommodated in an appropriate recess in pedestal 12.

On main shaft 15, near the left end thereof (i. e., toward the left side of the drawing sheet in Fig. 4) is a slip clutch 23 which comprises a flanged sleeve 24, a spur gear 25, a pressure plate 26, a spring washer 27, and a nut 28. As shown in the just-named figure, flanged sleeve 24 is secured to main shaft 15, as by a headless set screw 29; and spur gear 25, pressure plate 26, spring washer 27, and nut 28 fit on the flanged sleeve in the order stated and as also shown in Fig. 4. The axial opening in gear 25, which opening permits that gear to fit onto sleeve 24, is cylindrical so that the gear will either rotate with the sleeve or be rotatable thereon, depending upon the force exerted against the gear by pressure plate 26. This force will be discussed later herein. The axial opening in pressure plate 26, however, is provided with flats 30 which mate with corresponding flats 31 provided on the exterior of the sleeve. As a result of this arrangement, therefore, the pressure plate is not rotatable relative to flanged sleeve 24. Nut 28, having a cleft 32 and a headed clamp screw 33 (Fig. 4), is threaded onto the flanged sleeve's threaded end 34 to compress spring washer 27. The spring washer, in turn, is forced against pressure plate 26, the pressure plate is forced against one face of spur gear 25, and the other face of the spur gear is forced against the sleeve's flange. The amount by which the pressure plate is forced against the gear and the amount by which the gear is forced against the flange, of course, depends upon the extent to which nut 28 is threaded upon the sleeve's threaded end 34. In practice, nut 28 is threaded upon the sleeve's threaded end to such an extent that the clutch will slip (i. e., gear 25 will be rotatable relative to sleeve 24), if, for any reason, main shaft 15 encounters excessive resistance to its turning. Damage to the apparatus is thereby prevented. After nut 28 is positioned to provide the desired amount of force between the gear and the sleeve, the nut is secured in position on the sleeve's threaded end by headed clamp screw 33 (Fig. 4). This screw, when tightened, causes the nut to grip the flange's threaded end, thus preventing the nut from being loosened.

As shown in Fig. 4, gear 25 is in mesh with a gear 35 which is secured, in usual manner (not shown), to a shaft 36 of a synchronous motor 37; the just-named motor being supported by a bracket 38 which is secured to one face of vertical plate 11 in any convenient manner (not shown). Therefore, motor 37, when energized in usual fashion, will normally cause rotation of gear 25 and main shaft 15.

*Transfer wheel*

Also on main shaft 15, approximately mid-way between its ends, and located between vertical plate 11 and the pedestal 12, is a flanged sleeve 40 (Fig. 4) which is secured in position on the shaft and rendered rotatable in unison therewith in any convenient manner, as by a headless set screw 41. Mounted on sleeve 40 is a transfer wheel 42 (Figs. 1 and 4). This wheel is made of nonmagnetic material and is secured to sleeve 40 by headed screws 43 which pass through the wheel and thread into the sleeve in usual manner so that the transfer wheel is rotatable in unison with the sleeve.

Figure 2:
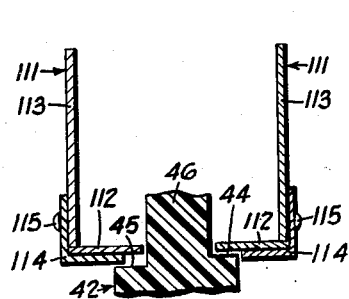
Fig. 2 is a cross section taken along line 2—2 of Fig. 1 and showing other details of construction relating to the apparatus' transfer wheel and to angle guides disposed relative thereto.
Figure 7:
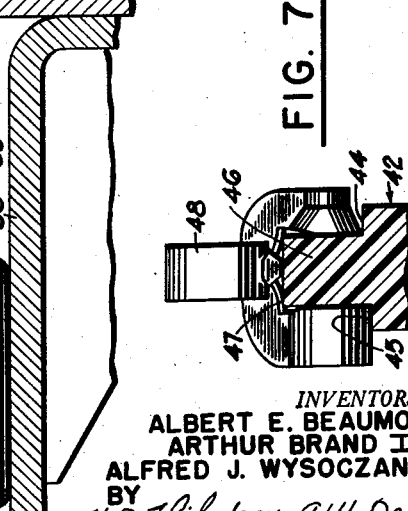
Fig. 7 is a cross section taken along line 7—7 of Fig. 1 and showing additional details relating to the apparatus' transfer wheel, to the general shape of the particular objects to be tested, and to how each of the objects is seated on the transfer wheel.

As shown in Figs. 1, 2 and 7, one face of the transfer wheel is provided with the shoulder 44 located a certain distance, in a radial direction, from the wheel's circumference; and, as shown in Figs. 2 and 7, the opposite face of the wheel is provided with a similar shoulder 45. As apparent from Figs. 1 and 7, these shoulders are provided to facilitate seating of the belt links 48 to be tested on the transfer wheel. In consequence of these shoulders, there is created, adjacent the circumference of the transfer wheel, the portion 46 (Figs. 1, 2 and 7) of reduced thickness, the breadth of this portion being slightly less than the dimension between certain parts of the belt links so that the links can straddle the wheel as shown in Fig. 7. Formed in the circumference of transfer wheel 42 is a plurality of equally spaced, ratchetlike teeth 47 (Fig. 1). As apparent from that figure, the depth of each tooth is of such dimension as to allow a belt link to be seated on the transfer wheel during a portion of the wheel's rotation.

*Timing discs, switches, and hood*

Also on main shaft 15, near the right end thereof (i. e., toward the right side of the drawing sheet in Fig. 4), is an externally threaded, flanged sleeve 50. This sleeve is secured in place on the shaft and is made rotatable in unison therewith by a headless set screw 51. Fitting on this sleeve, in a direction along the sleeve's axis, are timing discs 52, 53, 54, and 55 (Fig. 4). As there shown, these discs are spaced from each other by spacers 56. Formed in the circumference of each timing disc is a plurality of recesses 63 (the recesses in one of the discs being shown in Fig. 1). In the present instance, the number of these recesses corresponds to the number of ratchetlike teeth 47 in the transfer wheel, the recesses are shown as having a certain shape, and as being equally spaced apart. Later, however, it will be apparent that any convenient number of recesses, any necessary spacing, and other convenient shapes of recess may be employed.

The axial hole by virtue of which each timing disc is fitted onto sleeve 50 is substantially circular so that each disc either is rotatable with sleeve 50, or is rotatable relative thereto, depending upon the force exerted against the timing discs and the spacers. The manner of effecting this force will be explained later herein. The axial hole by virtue of which each spacer is fitted onto sleeve 50, however, is provided with a tongue 57 (one of which is partially shown in Fig. 4) which projects into engagement, in usual manner, with a keyway 58 provided in the sleeve. Therefore, none of the spacers is rotatable relative to sleeve 50. This construction is provided to enable independent rotative adjustment of the timing discs relative to each other and relative to the transfer wheel so that the apparatus' operation may be properly synchronized. This will be more easily understood later.

Also fitting on sleeve 50 are a spring washer 60, a pressure plate 61, and a nut 62, the axial opening in pressure plate 61 being provided with a tongue (not shown) similar to tongue 57 in each spacer. This tongue also is in engagement with the sleeve's keyway 58 so that the pressure plate, therefore, is not rotatable relative to the sleeve. This construction prevents accidental rotation of disc 55 out of its adjusted position, whenever it may be necessary to turn nut 62. In practice, nut 62, which may be provided with a clamping screw (not shown) similar to that discussed earlier with reference to nut 28, is threaded onto sleeve 50 to press against pressure plate 61. The pressure plate, in turn, compresses spring washer 60, and the washer, in turn, forces the timing discs and the spacers against each other so that the discs rotate in unison with each other and with sleeve 50.

Attached to base plate 10 is a knee bracket 65 (Fig. 1) which is secured in place, as by headed screws 66 used in the usual manner. At the top of this bracket, a pair of switches 67 (only one of which is shown) is disposed in side-by-side relationship. These switches are secured to bracket 65 by screws 68 (Fig. 1).

Both switches 67 are substantially identical in construction and in manner of operation. Therefore, a description of one will suffice for both. Each of these switches is provided with a resilient arm 69 to which a roller follower 70 and a contact 71 (Fig. 1) are attached in any convenient manner (not shown). Each of these switches, also, is provided with an arm 72 to which a contact 73 (Fig. 1) is similarly attached.

The roller follower of one of these switches bears constantly against timing disc 55 (Fig. 1), while the roller follower of the other one of these switches bears, in similar manner (not shown), against the timing disc 54 next adjacent thereto. It will be apparent, therefore, that, when those discs are rotated, the contacts of the respective switches are opened and closed as the followers move into and out of recesses 63 of the respective discs.

The switches 67 are electrically connected by wires (not shown) to a control box 74 (Fig. 1) which contains equipment, to be dealt with later herein, so that operation of one of the switches 67 will control operation of a first portion of that equipment, and operation of the other one of those switches will control the operation of a second portion of the equipment. This will be explained in more detail later herein.

Also attached to base plate 10 is a knee bracket 75 (Fig. 1) which is secured in place, as by headed screws 76. This bracket, like bracket 65 earlier described, is similarly provided with a pair of switches 77 (only one of which is shown) disposed in side-by-side relationship at the top of that bracket. These switches are secured to bracket 75 by screws 78. Switches 77, like those of pair 67 earlier described, are substantially identical in construction and in mode of operation. Therefore, a description of one switch of the pair under discussion will suffice for both. Each one of the switches 77 is provided with a resilient arm 79 to which a roller follower 80 (partially shown in Fig. 1) and a contact 81 are attached in any convenient manner (not shown). Each switch, also, is provided with an arm 82 to which a fixed contact 83 (Fig. 1) is similarly attached.

The roller follower of one switch of this pair is constantly urged against timing disc 53 (partially shown in Fig. 4) by virtue of resilient arm 79 (Fig. 1); and the roller follower of the other switch of this pair (not shown) is constantly urged against timing disc 52 disposed next adjacent thereto, (the disc being partially shown in Fig. 4) by virtue of the resilient arm forming part of that switch. Therefore, it will be apparent that, when the timing discs are rotated, the contacts of the respective switches of the pair under discussion are opened and closed as the followers move into and out of recesses 63 on the respective timing discs. That switch of pair 77 which is associated with timing disc 53 is electrically connected, by wires (not shown), to a third portion of the equipment contained in control box 74; but that switch of pair 77 which is associated with timing disc 52 is electrically connected, by wires (not shown), to an electric valve 134 (Fig. 1), later to be described. Therefore, operation of the switch associated with disc 53 will control operations of the third portion of the equipment in the control box; and operation of the switch associated with disc 52, in conjunction with operation of the third portion of the equipment in the control box, will control operation of the electric valve. Later explanation relative to the operation of our invention will enable an easier understanding of this matter.

In order to protect timing discs 52, 53, 54 and 55, pair of switches 67, and pair of switches 77 from being knocked out of synchronism, there is provided a U-shaped hood 84 (Fig. 1) which substantially encloses those members and which is attached to base plate 10 in any convenient manner (not shown).

Feed bar and seating nozzle

To the left of transfer wheel 42 (as viewed in Fig. 1) is a feed bar 90, the thickness of which (not shown) is substantially equal to the thickness of the transfer wheel's portion 46. This bar is secured, as by headed screws 91, to a support 92 so that the bar's right end is rather close to the maximum diameter of the transfer wheel, and so that the bar's thickness (not shown) is in alignment with the transfer wheel's portion 46. Support 92 is attached to base plate 10 in any convenient manner, as by headed screws 93. As shown in Fig. 1, the upper surface (i. e., toward the top of the drawing sheet in that figure) of feed bar 90 is inclined downwardly toward transfer wheel 42 so that belt links 48 whose hardness is to be tested will, when placed upon the bar, slide, by aid of gravity, toward the transfer wheel.

To insure optimum operation of our invention, it is preferable that each belt link be properly seated upon transfer wheel 42. In order to facilitate movement of each link from feed bar 90 onto transfer wheel 42, to aid in seating each belt link on the wheel, and to aid in holding the links seated on the wheel, there is provided a nozzle 94 (Fig. 1) above the right end of the feed bar and rather close to the circumference of the transfer wheel. This nozzle is provided with openings (not shown) so located that one stream of air made to flow from the nozzle is directed against the end of the feed bar, thereby aiding in moving the links from the bar onto the feed wheel and in seating the links thereon; and another stream made to flow from the nozzle is directed against the transfer wheel, thereby aiding in holding the links seated on the wheel. Compressed air is supplied to nozzle 94 by means of a conduit 95 (Fig. 1), to one end of which the nozzle is attached. The other end (not shown) of this conduit is connected to a source of compressed air (also not shown). As indicated in Fig. 1, the conduit is secured to vertical plate 11 by means of a screw 96. This screw passes through a tab 97 secured to the conduit and threads into the vertical plate in usual manner (not shown). As also shown in that figure, conduit 95 is provided with a manually operable valve 98 and with a pressure indicating gauge 99. By manipulation of valve 98, the volume of air flowing from the nozzle can be adjusted to produce the effect desired. Gauge 99, of course, indicates the pressure of the compressed air in the conduit between valve 98 and manifold 94.

Accept bar, angle guides, and side plates

To the right of transfer wheel 42 (as viewed in Fig. 1) is the accept bar 102, the thickness of which (not shown) is substantially equal to the thickness of the transfer wheel's portion 46. Bar 102 is secured, as by headed screws 103, to a support 104 so that the bar's left end is rather close to the maximum diameter of the transfer wheel, and so that the bar's thickness is in alignment with the transfer wheel's portion 46, as can be understood from Fig. 1. Support 104, in turn, is affixed to base plate 10, as by headed screws 105 (Fig. 1) which are used in the usual manner. As there shown, the upper surface of bar 102 is pitched downwardly away from transfer wheel so that belt links which are directed to that bar, as will subsequently be explained, and which straddle that bar in much the same manner as shown in Fig. 7, will slide, by gravity, along the bar away from the transfer wheel.

Figure 3:
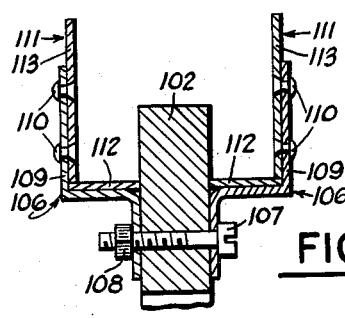
Fig. 3 is a cross section taken along line 3—3 in Fig. 1 and showing additional details of construction relating to the just named angle guides and to a bar which supports those guides.

Attached to each side of bar 102, near the left end thereof (as viewed in Fig. 1) is a bracket 106 (Figs. 1 and 3). These brackets are in substantial opposition with each other and are secured to bar 102 by the headed screw 107 to which the nut 108 (Fig. 3) is attached in usual manner. Secured to the portion 109 (Figs. 1 and 3) of each bracket, as by the rivets 110, is an angle guide 111, each angle guide comprising the bottom portion 112 and the side portion 113 (Figs. 1 and 3). In each angle guide, the bottom portion and the side portion are held in position with reference to each other by the brackets 114 (Figs. 1 and 2) and by the rivets 115 (some of which are shown in the just-named figures) used in the usual manner.

One of the angle guides is attached to one of the brackets 106 so that the guide's left end is disposed relative to one face of transfer wheel 42, as indicated in Figs. 1 and 2. In like manner, the other angle guide is attached to the other bracket 106 so that guide's corresponding end is similarly disposed relative to the other face of the transfer wheel (Fig. 2).

As shown in Fig. 1, bottom portion 112 of the angle guides (i. e., toward the bottom of the drawing sheet as viewed in that figure) is sloped downwardly away from transfer wheel 42 so that belt links which pass, as will be explained later, from the transfer wheel into the angle guides will slide, by gravity, down those guides and onto accept bar 102.

Figure 5:
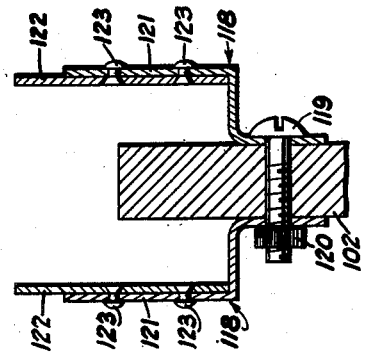
Fig. 5 is a cross section taken along line 5—5 of Fig. 1 and showing additional details relating to the support bar, referred to above, and to side plates disposed relative thereto.

Also attached to each side of bar 102, to the right (as viewed in Fig. 1) of bracket 106, is a bracket 118 (also see Fig. 5). These brackets are in substantial opposition to each other and are secured to bar 102 by a headed screw 119 (Figs. 1 and 5) which is provided with a nut 120 (Fig. 5) in usual manner. Secured to the portion 121 of each bracket is a side plate 122 (Figs. 1 and 5); each plate being secured to the respective bracket by rivets 123. As shown in Fig. 5, each side plate is spaced somewhat from the corresponding side of the bar. This is done to allow for subsequent passage of belt links along the bar.

*Reject chute, ejection conduits, and electric valve*

Above bar 102, earlier described, a reject chute 125 is disposed which (Fig. 1) comprises a bottom 126 and side members 127. This chute is for receiving those belt links whose hardness is found to be unacceptable. Chute 125 is attached to vertical plate 11 by a headed screw 128 (Fig. 1) which passes through a tab 129, forming part of that chute, and into the vertical plate in usual manner. As shown in Fig. 1, chute 125 is affixed to the vertical plate with the chute's left end in spaced relationship with reference to the transfer wheel's circumference, and with the chute's bottom 126 sloped downwardly away from the transfer wheel. This is done so that any belt link ejected, as will be explained later, from the transfer wheel into the chute will slide, by gravity, down the chute, then into a convenient receptacle (not shown).

In order to eject unacceptable belt links from transfer wheel 42 into chute 125, there is provided a pair of compressed air conduits 130 (only one of which is shown in Fig. 1); each conduit being disposed, as shown in Fig. 1, relative to opposite faces of transfer wheel 42. As shown in Fig. 1, the open end 131 of one of the conduits is disposed rather close to the transfer wheel's shoulder 44 and faces toward chute 125. Similarly, the open end (not shown) of the other conduit is disposed rather close to the transfer wheel's shoulder 45 and on the opposite side thereof and also faces chute 125.

The opposite end of each of conduits 130 is connected, in any convenient manner (not shown), to a manifold 132 (Fig. 1). For supplying air to this manifold, there is a feed line 133 (Fig. 1); one end of this line being connected to the manifold, and the other end (not shown) being connected to a source of compressed air (also not shown). As shown in Fig. 1, feed line 133 is provided with the earlier named electrically operated valve 134, a pressure gauge 135, and with a manually operable valve 136. When an electric circuit through valve 134 is completed, in a manner to be explained later, the valve is opened and a gust of air is allowed to pass through the valve, through conduits 130, and out the conduits' respective open ends 131, thereby to eject unacceptable belt links from the transfer wheel. This will be dealt with more fully later.

Manually operable valve 136, as usual, is adjustable to regulate the volume of air to electric valve 134, and pressure gauge 135 is used to indicate the pressure in that portion of feed line 133 between the electric valve and the manually operable valve.

*Magnetizing coil, demagnetizing coil, and pick-up coil*

Somewhat above (i. e., toward the top of the drawing sheet in Fig. 1) and toward the left side of transfer wheel 42 is a magnetizing coil 140 which is secured, in any convenient manner (not shown), to a bracket 141 made of non-magnetic material. This coil, preferably, is attached to bracket 141 so that the coil's axis is directed toward the center of transfer wheel 42, and so that the coil is disposed in such relation to the transfer wheel's circumference that, as the wheel is rotated, each belt link on the wheel is carried past the coil.

Bracket 141, in turn, is secured to vertical plate 11 by a headed screw 142. This screw passes through a slot 143 in the bracket and attaches to the vertical plate in usual manner. With this arrangement it is possible to adjust the position of the magnetizing coil relative to the transfer wheel as may be desired.

Magnetizing coil 140 is electrically connected by wires (not shown) to a portion of the equipment (not shown, but later to be dealt with) contained in control box 74. This portion of the equipment is so constructed that, when energized, a direct current is caused to flow through the magnetizing coil and, consequently, to create a magnetic field therearound so that the coil is able to serve as an electromagnetic means for exerting a magnetizing force on belt links 48 to be tested. This portion of the equipment is energized through the cooperation between timing disc 55 and that switch of pair 67 which is operatively associated with that disc.

Next to magnetizing coil 140, in a clockwise direction (as viewed in Fig. 1), is a demagnetizing coil 144 which is secured, in convenient manner, to a bracket 145 made of non-magnetic material. This coil, too, preferably, is attached to bracket 145 so that the coil's axis is directed toward the center of transfer wheel 42, and so that the coil is disposed in such relation to the transfer wheel's circumference that, as the wheel is rotated, each belt link on the wheel is carried past the coil.

Bracket 145, in turn, is attached to vertical plate 11 by a headed screw 146. This screw passes through a slot 147 in bracket 145 and attaches to the vertical plate in usual manner. With this arrangement, therefore, it is possible to adjust the position of the demagnetizing coil relative to the transfer wheel as may be desired.

Coil 144 is electrically connected by wires (not shown) to another portion of the equipment (not shown, but later to be dealt with) contained in control box 74. This portion of the equipment is so constructed that, when energized, through the cooperation between timing disc 54 and that switch of pair 67 which is operatively associated with that disc, a direct current is caused to flow through demagnetizing coil 144 and, consequently, to create a magnetic field therearound. However, the current caused to flow through the demagnetizing coil is such in amplitude, polarity, and duration that the magnetic field produced around the demagnetizing coil is of opposite polarity to the field created around magnetizing coil 140, and is such that the net effect of the field around the demagnetizing coil is to tend to counteract the effect of magnetizing coil 140. Thus, coil 144 is able to serve as an electro-magnetic means for exerting a demagnetizing force on the belt links to be tested. Later in this description, reference to the use of damped alternating current in coil 144, instead of direct current, will be made.

Next to coil 144, in a clockwise direction (as viewed in Fig. 1), is a pick-up coil 148 which is secured to the bracket 149 made of non-magnetic material. This coil, preferably, is attached to the bracket so that the coil's axis is directed toward the center of transfer wheel 42, and so that the coil is disposed in such relation to the transfer wheel's circumference that, as the wheel is rotated, each belt link on the wheel is carried past that coil.

Bracket 149, in turn, is secured to vertical plate 11 by a headed screw 150. This screw, as similarly explained with reference to screws 142 and 146, passes through a slot 151 in bracket 149 and threads into the vertical plate. Therefore, with this arrangement, the position of coil 148 relative to the transfer wheel's circumference can be adjusted, as may be desired.

Coil 148, like coils 140 and 144 earlier described, is electrically connected by wires (not shown) to still another portion of the equipment (not shown, but later to be dealt with) contained in control box 74. The operation of this portion of the equipment is controlled, as will later be explained, through the cooperation between disc 53 and that switch of pair 77 which is operatively associated therewith, is responsive to a voltage induced in pick-up coil 148 by each belt link whose hardness is to be tested, and acts according to the magnitude thereof to cause separation of links of unacceptable hardness from those of acceptable hardness.

Control box

Above vertical plate 11 is control box 74 which, as earlier stated, contains electrical equipment (not shown) which contributes to the operation of our invention. In essence, the electrical equipment in the control box may be considered to comprise three portions: a portion, electrically connected to magnetizing coil 140, for furnishing direct current to that coil; a portion, electrically connected to demagnetizing coil 144, for furnishing direct current to that coil; so as to create, about that coil, a magnetic field having a polarity opposite to that created about the magnetizing coil; and a portion, electrically connected to pick-up coil 148, for differentiating between acceptable and unacceptable belt links according to the voltage induced in that coil. Of course, this equipment may be provided with any required number of manually operable switches and with any convenient number of indicator lights, or the like. Inasmuch as such practice is commonplace, such switches and indicator lights are not shown in the drawings.

The principles of construction and operation of each of the just-named portions of the equipment in control box 74 are well known to those skilled in the art and, therefore, those portions, per se, are not substance of the present application. For that reason a detailed description of those portions of the electrical equipment in the control box is not warranted. However, in order to complement the description of our invention, a brief explanation relative to that equipment is given later herein when the operation of our invention is described.

Control box 74 is shown above vertical plate 11 merely for convenience of drawing. It is to be understood that the position of the control box relative to the vertical plate, or to any other part of our apparatus, shown in Fig. 1, is immaterial. In some instances, control box 74, actually, may be remotely located with reference to other parts of the apparatus.

Extending between vertical plate 11 and control box 74 is a conduit 152 (Fig. 1) which contains the electrical wires (not shown) necessary to connect magnetizing coil 140, demagnetizing coil 144, pick-up coil 148, pair of switches 67 (only one of which is shown), pair of switches 77 (only one of which is shown), electric valve 134, and synchronous motor 37 (Fig. 4) to the equipment contained in control box 74. Of course, this conduit and the wires therein are of convenient length, depending upon the distance between the control box and the rest of the apparatus.

Electricity enabling operation of our method and apparatus is furnished through wires (not shown) contained in a flexible conduit 153 (Fig. 1). The outer ends (not shown) of these wires (i. e., the ends outside control box 74) are connected, in usual fashion, to prongs 154 which form part of an electrical plug 155. This plug, as is usual, is connectable to a source of electricity (not shown).

Operation

Belt links 48, whose hardness is to be tested, are deposited, one at a time, on the left end of feed bar 90 (Fig. 1) so that each link straddles that bar in much the same manner as a belt link is shown (Fig. 7) straddling transfer wheel 42. Deposition of the belt links on the feed bar can be done manually, or automatically by use of machinery (not shown). Each link is deposited on the feed bar in substantially the same position relative thereto; preferably, in the position indicated in Fig. 1. Because the upper surface of the feed bar is sloped downwardly toward transfer wheel 42, as earlier stated, the belt links slide, by gravity, down the feed bar toward the transfer wheel.

As the transfer wheel is rotated, in the direction indicated by the arrowed line 156 (Fig. 1), through action of electric motor 37 (Fig. 4), one belt link at a time passes from feed bar 90 onto the transfer wheel and becomes seated in one of the transfer wheel's ratchet-like teeth 47 (Figs. 1 and 7); passage of each belt link from the feed bar onto the transfer wheel and seating of each link on that wheel being facilitated by the continuous stream of air made to flow from nozzle 94 under control of valve 98. As the transfer wheel continues to rotate, each link in turn is moved, without interruption, successively past magnetizing coil 140, demagnetizing coil 144, and pick-up coil 148 toward angle guides 111 and chute 125; each link being maintained seated on the wheel, while being moved past the first two just-named coils, by another continuous stream of air from nozzle 94. While each link is so moved, our method of testing, presently to be described, is performed.

For simplicity of explanation, the operation of our invention will be explained as pertaining to only one belt link. It will be easily understandable that the operation of the invention, as pertaining to other belt links, is merely a repetition of the operation explained for one belt link.

As the belt link whose hardness is to be determined passes beneath magnetizing coil 140, one recess 63 of timing disc 55 allows that switch, of pair 67, operatively associated with the disc to close. This action causes operation of that portion of the electrical equipment, in control box 74, for furnishing direct current to the magnetizing coil; the duration of this current being controlled by components which form part of that equipment, rather than by the depth or the shape of the recess in the timing disc. As current flows through the magnetizing coil, a magnetic field is created therearound. This magnetic field surrounds the belt link and induces magnetism in the link. Preferably current through magnetizing coil 140 should be sufficient to produce magnetic saturation of the belt links to be tested. Of course, each link to be tested is exposed to a field of substantially the same strength.

In the present instance, the magnetism induced in the belt link is considered in terms of the hardness of the material of which the link is made. As earlier stated herein, however, our invention may also be used in nondestructively testing characteristics, other than hardness, of magnetic material. Therefore, the magnetism induced in the link may be in terms of other than hardness.

As the belt link passes beneath demagnetizing coil 144, one recess of timing disc 54 allows that switch, of pair 67, operatively associated with that disc to close. This action causes operation of that portion of the electrical equipment, in control box 74, for furnishing current, of the nature earlier stated, to demagnetizing coil 144; the duration of this current being controlled by components which form part of the equipment, rather than by the depth or the shape of the recess in the timing disc. As current flows through the demagnetizing coil, a magnetic field, having a polarity opposite to that created around magnetizing coil 140, is created. This field surrounds the belt link and removes some or all of the magnetism previously induced, the amount of magnetism removed depending upon the magnetic retentivity of the material of which the link is made. The function of the demagnetizing coil is such as to artificially age the belt link (i. e., the application of a demagnetizing field to the belt link has a tendency to stabilize the magnetism induced originally by the magnetizing coil 140). Thus, as a result of this action, a wide span is created between the amount of magnetism retained by belt links having a hardness at the upper limit of acceptability and the amount retained by belt links having a hardness at the lower limit of acceptability. This condition enables easy differentiation, later to be explained, between belt links of acceptable hardness and those of unacceptable hardness. It is to be understood, of course, that all links are to be subjected to a demagnetizing field of substantially the same strength. In the present instance, the amount of magnetism retained by the belt link is considered to be in terms of the hardness of the material of which the link is made; the harder the link, the greater the retentivity. Therefore, the harder the link, the greater is the amount of magnetism retained therein after subjection to the demagnetizing force caused by the current through the demagnetizing coil. Of course, retentivity may also be considered in terms of a property other than hardness, depending upon what characteristic is being tested.

Before the belt link passes beneath pick-up coil 148, one of the recesses of timing disc 53 allows that switch of pair 77 operatively associated with that disc, to close. This action, in turn, opens the differentiating circuit and, in so doing, removes from the differentiating portion of the equipment, in control box 74, all electrical effects on that portion of the equipment caused by a preceding belt link. This action, in other words, conditions the differentiating portion of the equipment to be acted upon by the magnetism retained in the belt link moving toward the pick-up coil.

As the belt link passes beneath pick-up coil 148, a voltage is induced in that coil by the magnetism retained in the belt link after being subjected to the influence of the magnetic field created around demagnetizing coil 144. The amplitude of the voltage induced in the pick-up coil, of course, depends upon the amount of magnetism retained by the link; the harder the link, the greater the density of the magnetic field surrounding the link, and therefore, the greater the amplitude of the voltage induced in the pick-up coil as the link passes thereby. Voltage induced in pick-up coil 148 is conducted by wires (not shown), to that portion of the control box's equipment for differentiating between acceptable and unacceptable belt links according to the amplitude of the voltage induced in the pick-up coil.

If the hardness of the belt link, as determined according to the voltage induced in the pick-up coil, is above the maximum limit of acceptability or is below the minimum limit of acceptability, the differentiating portion of the equipment in control box 74 acts, in response to that voltage, to close an electric circuit to, but not through, electric valve 134. This action is in preparation for subsequently ejecting the unacceptable belt link from transfer wheel 42. The link is ejected from the transfer wheel when the link is radially opposite open ends 131 of conduits 130 and is caused by a gust of air which is made to flow from the open ends of the conduits in the following manner.

When a link of unacceptable hardness is radially opposite the open ends of conduits 130, one of the recesses in timing disc 52 allows that switch, of pair 77, operatively associated with that disc to close. This action completes an electrical circuit through electric valve 134, thereby causing that valve to open temporarily. The air then flows through conduits 130 and out the conduits' open ends to eject the link of unacceptable hardness from the transfer wheel and into chute 125. When valve 134 opens, pressure gauge 135 registers a corresponding temporary reduction in pressure. This action, in addition to the ejection of the link from the transfer wheel, indicates that hardness is unacceptable. Of course, other indicating means (e. g., electric lights, electric meters, buzzers, or the like, none of which is shown) could be used. Because the bottom of chute 125 is sloped downwardly away from the transfer wheel, such a belt link will slide, by gravity, down that chute and into an appropriate container (not shown).

If the hardness of the belt link, as determined by the voltage induced in coil 148, is within the minimum and the maximum limits of acceptability, the differentiating portion of the equipment does not act to close the circuit to electric valve 134. Therefore, as the transfer wheel continues to rotate, the belt link passes by the conduits' open ends. Even though, at that time, one of the recesses in timing disc 52 allows the switch operatively associated with that disc to close, no current will pass through electric valve 134, because the differentiating portion of the equipment had not acted to close the circuit up to, but not through, that valve. Consequently, no gust of air is released from conduits 130 to eject the link of acceptable hardness from the transfer wheel. Therefore, the belt link, if its hardness has been found to be acceptable, will remain on the transfer wheel until it drops off into angle guides 111. Because the bottoms of these guides are sloped downwardly away from the transfer wheel, as earlier explained, the link will slide down, by gravity, those guides and onto bar 102. Similarly, because the upper surface of that bar is sloped downwardly away from the transfer wheel, the link will slide, similarly, down that bar and into position for subsequent handling (e. g., packaging) by other equipment not forming a part of this application.

From the foregoing, it will be apparent that we have provided an improved method of non-destructively testing objects made of magnetic materials, then later separating the objects as acceptable or as unacceptable; that we have increased the accuracy and sensitivity of non-descructive testing procedures; and that we have provided apparatus for accomplishing our method.

Those skilled in the art will understand that, without departing from its original spirit and scope, our invention may exist in numerous modified and varied forms other than that disclosed for illustrative purposes. For example, instead of passing direct current through coil 144, as explained earlier herein, a damped alternating current may be passed through that coil. Such current can be obtained by use of well known equipment (not shown). If damped alternating current is used, it is preferable that the first pulse of that current be of opposite polarity to the current passed through coil 140 and also that this current create a demagnetizing field the net effect of which is less than the effect of the magnetizing field of coil 140. With such a damped alternating current, a wide span between the amount of magnetism retained by the belt links at the upper limit of acceptability and the amount retained by the links at the lower limit of acceptability can be obtained, thereby enabling easy differentiation between links of acceptable hardness and those of unacceptable hardness.

Figure 8:
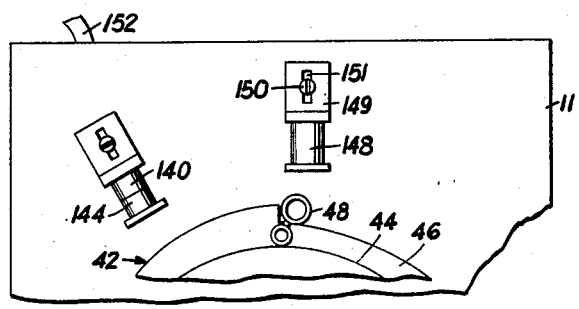
Fig. 8 is a portion of the Fig. 1 apparatus showing a modified construction relating to the apparatus' magnetizing and demagnetizing coils.

Another modification is to have magnetizing coil 140 and demagnetizing coil 144 on the same coil form (i. e., the structure, not shown, upon which such coils are usually wound). With this type of modification, the coils may be placed in various positions with relation to each other (e. g., the coils may be adjacent each other in an axial direction, or one coil may be within the other coil). One illustrative embodiment of the modification under discussion, showing the magnetizing and the demagnetizing coils adjacent to each other in an axial direction, is represented in Fig. 8. This figure shows only the modified portion of the Fig. 1 apparatus; it being understandable that the remaining portion of the Fig. 8 apparatus is substantially the same as shown in Fig. 1. As evident from Fig. 8 and from earlier description, the coils are so positioned with reference to transfer wheel 42 that, when current is made to flow through one of the coils, a magnetizing field is created to exert its influence on each belt link; and when, at a different time, current is made to flow through the other coil, a demagnetizing field is created to exert its influence on each belt link, as earlier explained. When this modification is used it is necessary to adjust rotatively the position of timing disc 55 relative to timing disc 54 (Figs. 1 and 4) so that the magnetizing and the demagnetizing coils are energized at different times while the belt link is under the coil form. This adjustment can be made in a manner clearly understandable from earlier description herein.

Figure 9:
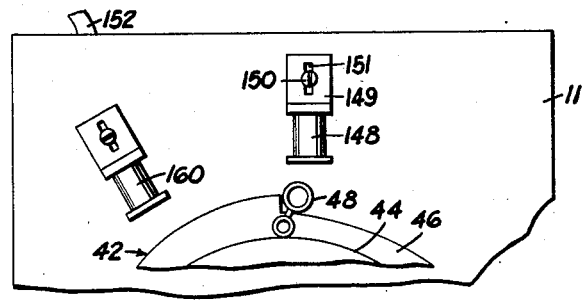
Fig. 9 also is a portion of the Fig. 1 apparatus showing another modified construction relating to the apparatus' magnetizing and demagnetizing coils.

Another possible modification is to have one coil 160 serve the purpose of both the magnetizing and the demagnetizing coils. This can be done by having current flow through the coil, first in one direction, to create a magnetizing field; then flow through the coil in the opposite direction to create a demagnetizing field. Such a modification is represented in Fig. 9 which shows only the modified portion of the Fig. 1 apparatus; it being understandable that the remaindner of the Fig. 8 apparatus is substantially the same as shown in Fig. 1. As evident from Fig. 9 and previous description, coil 160 is so located with reference to transfer wheel 42 that the magnetizing and the demagnetizing fields can exert their respective influences on the belt link, as earlier explained. When this modification is employed, the position of timing disc 55 (Figs. 1 and 4) can be adjusted rotatively relative to timing disc 54, in a manner understandable from previous description, so that the magnetizing and the demagnetizing fields can be created at the desired time.

A further modification of our invention may be envisioned by having the current which creates the demagnetizing field be of such nature that the strength of that field is stronger than the magnetizing field. This procedure can be effected by modification of the equipment in control box 74 (Fig. 1), in a manner well known to those skilled in the art; and can be employed in the embodiments shown in Figs. 1, 8 and 9.

Because our invention may exist in numerous modified and varied forms, we do not want to be limited in patent coverage by the relatively narrow confines inherent in the embodiment of the invention disclosed herein; but, rather, only by the metes and bounds of the appended claims.

We claim:

1. In apparatus for non-destructively testing and for subsequently sorting objects made of magnetic material, the combination of: a support, means on said support for exerting a magnetizing force on the objects; means on said support, disposed angularly relative to said magnetizing means, for exerting a demagnetizing force on the objects; means on said support, disposed angularly relative to said magnetizing and to said demagnetizing means, for differentiating between acceptable and unacceptable objects according to the amount of magnetism retained by the objects; a rotatable transfer wheel disposed on said support relative to said magnetizing, to said demagnetizing, and to said differentiating means, said transfer wheel being adapted for receiving the objects and for moving the objects one at a time past said magnetizing, demagnetizing, and differentiating means in succession; and means, disposed on said support relative to said transfer wheel, for ejecting unacceptable objects from that wheel, the operation of said ejecting means being responsive to the operation of said differentiating means.

2. The apparatus of claim 1 plus a reject chute disposed on the support with respect to the transfer wheel and to the ejecting means, said chute serving to receive the objects ejected from the wheel then to direct them away from the apparatus.

3. In apparatus for non-destructively testing objects made of magnetic materials, the combination of: a support; means, on said support, for exerting a magnetizing force on the objects; means, on said support, for exerting a demagnetizing force on the objects; means, on said support, for differentiating between acceptable and unacceptable objects, the operation of said differentiating means being responsive to the magnetism retained by the objects; means, on said support, for carrying the objects past said magnetizing, demagnetizing and differentiating means successively; feed means on said support, said feed means serving to direct the objects to said carrying means; and means, on said support, for aiding in moving the objects from said feed means to said carrying means and also aiding in seating those objects on said carrying means.

4. The combination of claim 3 wherein the seating means is a nozzle, the inlet of said nozzle being connected to a source of compressed air and the outlet of said nozzle directing at least one stream of air against the objects to aid in moving them from the feed means to the carrying means and also to aid in seating these objects on the carrying means.

5. The combination of claim 4 in which the outlet of the nozzle, additionally, directs at least one other stream of air against the objects for the purpose of maintaining those objects seated on the carrying means while the objects are being carried past the magnetizing and the demagnetizing means.

6. In apparatus, including magnetizing, demagnetizing and pick-up coils, for non-destructively testing objects made of magnetic material, the combination of: a support for the coils; a rotatable shaft mounted on said support; a transfer wheel on said shaft, said transfer wheel being constructed so as to receive and seat the objects upon its edge and so as to carry those objects, one at a time, past the magnetizing, demagnetizing and pick-up coils in succession; and means on said support for ejecting from the transfer wheel objects found unacceptable by the pick-up coil, the operation of said ejecting means being responsive to the operation of the pick-up coil.

7. The combination of claim 6 in which the ejecting means is an electrically operated valve, the inlet of said valve being connected to a source of compressed air and the outlet of said valve being disposed with respect to the transfer wheel so that a blast of air from the outlet ejects unacceptable objects from the transfer wheel.

8. The combination of claim 7 plus a chute disposed in an inclined position with respect to the transfer wheel and with respect to the outlet of electric valve, said chute for receiving the objects ejected from the transfer wheel by the operation of the valve and for directing these objects away from the transfer wheel.

9. The combination of claim 7 plus means for indicating when the valve operates to eject unacceptable objects from the wheel.

10. The combination of claim 9 in which the indicating means is a pressure gage connected to the valve so the gage registers a drop in air pressure each time the valve is operated.

11. The combination of claim 6 plus means connected to the shaft and operable to effect that shaft's rotation.

12. The combination of claim 11 in which the means for effecting rotation of the shaft is an electric motor mounted on the support and operatively connected to the shaft.

13. The combination of claim 12 plus an overload clutch between the motor and the shaft.

14. The combination of claim 6 plus means for controlling and synchronizing the operation of the magnetizing, the demagnetizing, and the pick-up coils and also controlling and synchronizing the operation of the ejecting means.

15. The combination of claim 14 in which the controlling and synchronizing means is a plurality of timing discs and electric switches, said timing discs being disposed on the shaft and being rotatable in unison therewith, and said switches being disposed on the support with respect to said timing discs so as to be operable thereby and being connected to the coils and to the ejecting means so that operation of said switches controls the operation of the coils and the ejecting means.

References Cited in the file of this patent

UNITED STATES PATENTS

| | | |
|---|---|---|
| Re. 21,927 | Brace et al. | Oct. 21, 1941 |
| 2,283,885 | Toelke et al. | May 19, 1942 |
| 2,382,885 | Landay et al. | Aug. 14, 1945 |
| 2,405,098 | Persson et al. | July 30, 1946 |
| 2,424,917 | Brannock | July 29, 1947 |
| 2,427,774 | Fredrickson | Sept. 23, 1947 |